US012811167B2

(12) United States Patent
Ringk et al.

(10) Patent No.: US 12,811,167 B2
(45) Date of Patent: Nov. 24, 2026

(54) BIPOLAR PLATE, ELECTROCHEMICAL CELL, AND PROCESS FOR MANUFACTURING AN ELECTROCHEMICAL CELL

(71) Applicants: Robert Bosch GmbH, Stuttgart (DE); Powercell Sweden AB, Gothenburg (SE)

(72) Inventors: Andreas Ringk, Bamberg (DE); Anton Ringel, Bamberg (DE); David Thomann, Bamberg (DE); Martin Gerlach, Strullendorf (DE); Stefan Munthe, Gothenburg (SE)

(73) Assignees: Robert Bosch GmbH, Stuttgart (DE); Powercell Sweden AB, Gothenburg (SE)

( * ) Notice: Subject to any disclaimer, the term of this patent is extended or adjusted under 35 U.S.C. 154(b) by 676 days.

(21) Appl. No.: 18/257,958

(22) PCT Filed: Dec. 15, 2021

(86) PCT No.: PCT/EP2021/085918

§ 371 (c)(1),
(2) Date: Jul. 28, 2023

(87) PCT Pub. No.: WO2022/129184

PCT Pub. Date: Jun. 23, 2022

(65) Prior Publication Data

US 2024/0047709 A1 Feb. 8, 2024

(30) Foreign Application Priority Data

Dec. 17, 2020 (DE) ..................... 10 2020 216 096.1

(51) Int. Cl.
*H01M 8/0273* (2016.01)
*H01M 8/0284* (2016.01)
(Continued)

(52) U.S. Cl.
CPC ....... *H01M 8/0273* (2013.01); *H01M 8/0284* (2013.01); *H01M 8/0286* (2013.01); *H01M 8/1004* (2013.01)

(58) Field of Classification Search
CPC ............. H01M 8/0273; H01M 8/0284; H01M 8/0286; H01M 8/1004
See application file for complete search history.

(56) References Cited

U.S. PATENT DOCUMENTS

2005/0173833 A1 8/2005 Cummins
2011/0294033 A1* 12/2011 Andrin ................ H01M 8/1004 429/480

(Continued)

FOREIGN PATENT DOCUMENTS

DE 60203392 T2 4/2006
DE 102010056014 A1 6/2012

(Continued)

OTHER PUBLICATIONS

DE102016121614 MT (Year: 2016).*

(Continued)

*Primary Examiner* — Alexander Usyatinsky
(74) *Attorney, Agent, or Firm* — Michael Best & Friedrich LLP

(57) ABSTRACT

Disclosed is a bipolar plate (20) for an electrochemical cell (100), in particular a fuel cell. The bipolar plate (20) includes at least one polymeric connecting element (21) for connection to a membrane-electrode assembly (1).

16 Claims, 4 Drawing Sheets

(51) Int. Cl.
*H01M 8/0286* (2016.01)
*H01M 8/1004* (2016.01)

(56) References Cited

U.S. PATENT DOCUMENTS

| | | | | |
|---|---|---|---|---|
| 2012/0034542 A1* | 2/2012 | Martin | ................ | H01M 8/0284 429/480 |
| 2016/0254532 A1* | 9/2016 | Zeng | .................. | H01M 10/058 156/60 |

FOREIGN PATENT DOCUMENTS

| | | | | |
|---|---|---|---|---|
| DE | 102015218117 A1 | 12/2016 | | |
| DE | 102015223040 A1 | 5/2017 | | |
| DE | 102016121614 A1 | 5/2018 | | |
| DE | 102017215504 A1 | 3/2019 | | |
| JP | 2009021217 A | 1/2009 | | |
| WO | WO-9934467 A2 * | 7/1999 | ........... | C25B 11/031 |

OTHER PUBLICATIONS

Translation of International Search Report for Application No. PCT/EP2021/085918 dated Mar. 16, 2022 (2 pages).
Chinese Patent Office. Office Action for Application No. 202180094002. X, dated Jul. 30, 2026 (16 pages with translation).

* cited by examiner

BIPOLAR PLATE, ELECTROCHEMICAL CELL, AND PROCESS FOR MANUFACTURING AN ELECTROCHEMICAL CELL

BACKGROUND

The present invention relates to a bipolar plate for an electrochemical cell, an electrochemical cell—in particular a fuel cell—and a process for manufacturing an electrochemical cell Electrochemical cells, in particular fuel cells, with membrane-electrode assemblies and bipolar plates are known in the prior art, for example from the patent application DE102015218117 (A1). The membrane-electrode assemblies usually comprise a membrane and one electrode layer each on both sides of the membrane, optionally also diffusion layers. The membrane and the electrode layers are circumferentially surrounded by a frame structure, often referred to here as a sub-gasket. When stacking a cell stack consisting of a large number of electrochemical cells, bipolar plates and membrane-electrode assemblies are alternately stacked one on top of the other.

SUMMARY

The object of the present invention is now to provide an electrochemical cell with a membrane-electrode assembly and a bipolar plate, which are secured against slippage for the stacking process, and thus a position-accurate stacking of the individual components and/or cells into a cell stack consisting of multiple electrochemical cells. Furthermore, a bipolar plate is to be provided that enables the construction of such an electrochemical cell secured against slippage.

The bipolar plate according to the invention includes at least one polymeric connecting element for connection to a membrane-electrode assembly. The connecting element can subsequently be melted or materially bonded to the membrane-electrode assembly, in particular to a film of a frame structure of the membrane-electrode arrangement. For this purpose, the connecting element is preferably formed from a thermoplastic polymer, for example PEN (polyethylene naphthalate). Advantageously, the film of the membrane-electrode assembly, to which the connecting element is melted, is formed from the same material as the connecting element itself.

In preferred further developments, the connecting element is anchored in a recess formed in the bipolar plate. As a result, the connecting element has a positive-locking connection to the bipolar plate and can accordingly transfer comparatively high transverse forces between the bipolar plate and the membrane-electrode assembly.

In advantageous embodiments, the connecting element is a continuation of a sealing contour applied to the bipolar plate. The connecting element and the sealing contour are thus made of the same material. The sealing contour is usually arranged surrounding an active surface and/or distributor openings of the bipolar plate. Preferably point by point, this sealing contour now also represents the connecting elements, in that it is later melted to the film of the frame structure of the membrane-electrode assembly at these points. Particularly preferably, the sealing contour is anchored at precisely these points in recesses of the bipolar plate.

Particularly preferably, the connecting element is a continuation of two sealing contours applied to the bipolar plate, wherein the two sealing contours are applied to opposite sides of the bipolar plate. One sealing contour serves to seal the cathode space of the electrochemical cell and the other sealing contour serves to seal the anode space of the adjacent electrochemical cell. In advantageous further developments, the two sealing contours are made of different materials, particularly preferably PEN and PUR (polyurethane). In advantageous embodiments, the connecting element represents a point by point melting of these two materials; the point by point melting is preferably localized inside the bipolar plate, ideally between two distributor plates of the bipolar plate.

The invention also comprises an electrochemical cell, in particular a fuel cell, with a bipolar plate and a membrane-electrode unit. The bipolar plate has a design as described above.

The membrane-electrode assembly comprises a frame structure, wherein the frame structure has a film. The film is melted to the connecting element of the bipolar plate, in particular materially bonded. Thus, sufficient strength of the connection between the bipolar plate and the membrane-electrode assembly is achieved for the stacking process, wherein this compound is tolerated within narrow limits for stacking by the embodiments of the invention, such that functional surfaces of the bipolar plates and the membrane-electrode assemblies can be positioned very precisely with each other.

Preferably, the connecting element and the film are made of the same material, particularly preferably a thermoplastic polymer such as PEN.

In advantageous embodiments, the connecting element represents a continuation of a sealing contour, which is arranged between the bipolar plate and the membrane-electrode assembly. Usually, the sealing contour seals an active surface and/or distributor openings between the bipolar plate and the membrane-electrode unit so that mixing of the operating media does not occur. The function of the connecting element is thus integrated into the sealing contour.

If the connecting element is embodied as a 2-component connecting element, therefore as a continuation of two sealing contours applied to the bipolar plate, it preferably consists of PEN and PUR, analogous to the two sealing contours melted to it.

In advantageous manufacturing processes, the connection of the film to the connecting element is generated thermally—preferably by means of a hot punch. This allows the membrane-electrode assembly to be first positioned towards the bipolar plate during manufacture without interfering adhesive forces. The adhesive forces are then activated or generated by means of the hot punch.

Accordingly, the present invention also comprises a process for manufacturing an electrochemical cell according to any of the above embodiments, wherein the bipolar plate is connected to the membrane-electrode assembly. The bipolar plate includes at least one polymeric connecting element for a connection to the membrane-electrode assembly. The membrane-electrode assembly has a frame structure with at least one film.

The method comprises the following steps:

- positioning the membrane-electrode assembly to the bipolar plate.
- melting the film to the connecting element, preferably by means of a hot punch.

By positioning the membrane-electrode assembly to the bipolar plate, an electrochemical cell is formed in the sense of the invention. Only then are the film and the connecting element melted together so that the positioning can be carried out without interfering adhesion forces.

The invention also relates to further electrochemical cells, such as battery cells and electrolysis cells.

Further measures improving the invention arise from the following description of a few embodiment examples of the invention, which are schematically represented in the figures. All of the features and/or advantages arising from the claims, description or drawings, including structural details, spatial arrangements and method steps, can be essential to the invention both by themselves and in the various combinations. It should be noted that the figures have only a descriptive character and are not intended to limit the invention in any way.

BRIEF DESCRIPTION OF THE DRAWINGS

The following are shown schematically.

DETAILED DESCRIPTION

Figure 1:
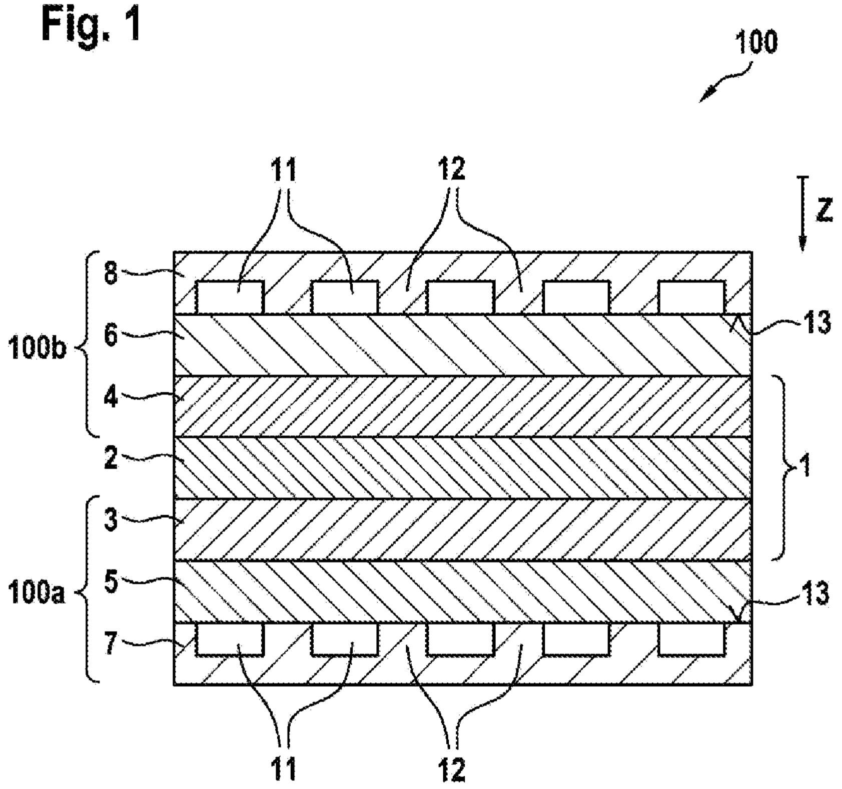
FIG. 1 the section through a fuel cell known from the prior art, wherein only the essential regions are shown, FIG. 2 in an exploded perspective view, an electrochemical cell having a membrane-electrode assembly between two bipolar plates, wherein only the essential regions are shown, FIG. 3 a membrane-electrode assembly in a perspective view, wherein only the essential regions are shown, FIG. 4 a section through a membrane-electrode assembly with a frame structure, wherein only the essential regions are shown, FIG. 5 a section through a cutout of an electrochemical cell according to the invention with a bipolar plate and a membrane-electrode assembly, wherein only the essential regions are shown, FIG. 6*a* a top view of a cathode-side distributor plate, wherein only the essential regions are shown.

FIG. 1 schematically shows an electrochemical cell 100 known from the prior art in the form of a fuel cell, wherein only the essential regions are shown. The fuel cell 100 comprises a membrane 2, in particular a polymer electrolyte membrane. To one side of the membrane 2 a cathode space 100*a* is formed, to the other side an anode space 100*b*.

In the cathode space 100*a*, outwardly facing from the membrane 2—therefore in the normal direction or stacking direction z—an electrode layer 3, a diffusion layer 5 and a distributor plate 7 are arranged. Analogously, an electrode layer 4, a diffusion layer 6 and a distributor plate 8 are arranged in the anode space 100*b* facing outwardly from the membrane 2. The membrane 2 and the two electrode layers 3, 4 form a membrane-electrode assembly 1. Optionally, the two diffusion layers 5, 6 can also be a component of the membrane-electrode assembly 1. Optionally, one or both diffusion layers 5, 6 can also be eliminated, provided that the distributor plates 7, 8 can provide sufficiently homogeneous gas feeds.

The distributor plates 7, 8 have channels 11 for the gas supply—for example air in the cathode space 100*a* and hydrogen in the anode space 100*b*—to the gas diffusion layers 5, 6. The diffusion layers 5, 6 typically consist of a carbon fiber fleece on the channel side—i.e., towards the distributor plates 7, 8—and a microporous particle layer on the electrode side—i.e., towards the electrode layers 3, 4.

The distributor plates 7, 8 comprise the channels 11 and thus implicitly also connecting portions 12 adjacent to the channels 11. The undersides of these connecting portions 12 thus form a contact surface 13 of the respective distributor plate 7, 8 to the underlying diffusion layer 5, 6.

Usually, the cathode-side distributor plate 7 of an electrochemical cell 100 and the anode-side distributor plate 8 of the electrochemical cell adjacent thereto are fixedly connected, for example by welded connections, and thus combined into a bipolar plate 20.

Figure 2:
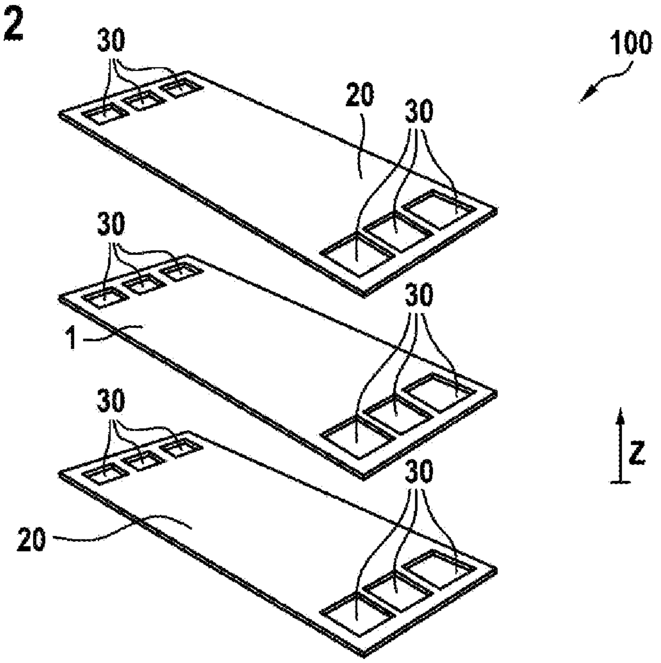

FIG. 2 schematically shows the arrangement of a membrane-electrode assembly 1 between two bipolar plates 20 in an exploded perspective representation. In FIG. 2, distributor openings 30 can also be seen, which are formed in the membrane-electrode assembly 1 as well as in the bipolar plates 20 in the form of recesses. When the electrochemical cells 100 are stacked on top of each other, the distributor openings 30 then form distributor channels in the stacking direction z, from which the individual channels 11 of the stacked electrochemical cells 100 are supplied with media. Advantageously, each membrane-electrode assembly 1 and each bipolar plate 20 have a total of six distributor openings 30, namely an inlet and outlet each for the three media, anode gas, cathode gas and cooling medium.

Accordingly, for a cell stack consisting of multiple electrochemical cells 100—for example up to 500—many membrane-electrode assemblies 1 and bipolar plates 20 must be stacked alternately. Here, the bipolar plates 20 and membrane-electrode assemblies 1 must be placed on top of each other with positional accuracy in order to ensure the best possible overlap of the functional regions and thus the function of the entire cell stack. Functional regions are, for example, channels 11 and connecting portions 12, or the distributor openings 30 or seals not shown.

In order to ensure position-accurate stacking without sliding when stacking the membrane-electrode assemblies 1 and bipolar plates 20 to a cell stack, in each case one membrane-electrode assembly 1 is now attached to one bipolar plate 20. This can be done directly when stacking the individual cells 100 to a cell stack. Alternatively, each membrane-electrode assembly 1 can be connected to a bipolar plate 20 and the resulting cells 100 can then be stacked, aligned, and compressed into a cell stack. The notation "cell" then does not precisely relate to a single operable electrochemical cell 100 consisting of membrane electrode assembly 1 and half each of two bipolar plates 20, but rather to the connection of a whole bipolar plate 20 to a membrane-electrode assembly 1. Accordingly, the term "cell" is used for the composite of a membrane-electrode assembly 1 and a bipolar plate 20 for a cell 100 according to the present invention.

Figure 3:
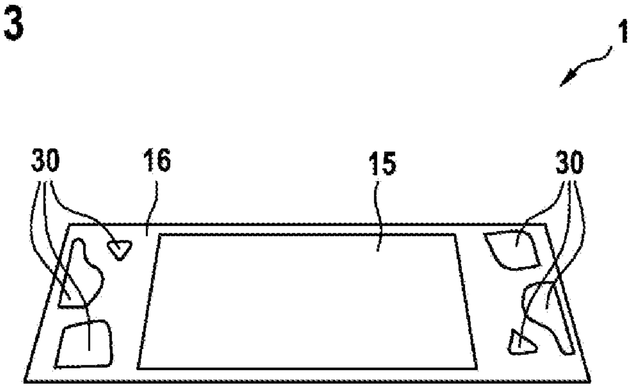

FIG. 3 shows a membrane-electrode assembly 1 in a perspective view, wherein only the essential regions are shown. The membrane-electrode assembly 1 has an active surface 15 in its middle. At least the membrane 2 and the two electrode layers 3, 4—optionally also the two diffusion layers 5, 6—are arranged here. The active surface 15 then interacts in the electrochemical cells 100 with the channels 11 and connecting portions 12 of the distributor plates 7, 8 and the bipolar plates 20. During operation of the cell stack, the active surface 15 has a current density, i.e., electrical current is generated or converted here.

The active surface 15 is enclosed by a frame structure 16, in the present embodiment the frame structure 16 surrounds the active surface 15 over the entire circumference. The distributor openings 30 for the anode gas, cathode gas and cooling medium are formed in the frame structure 16.

Figure 4:
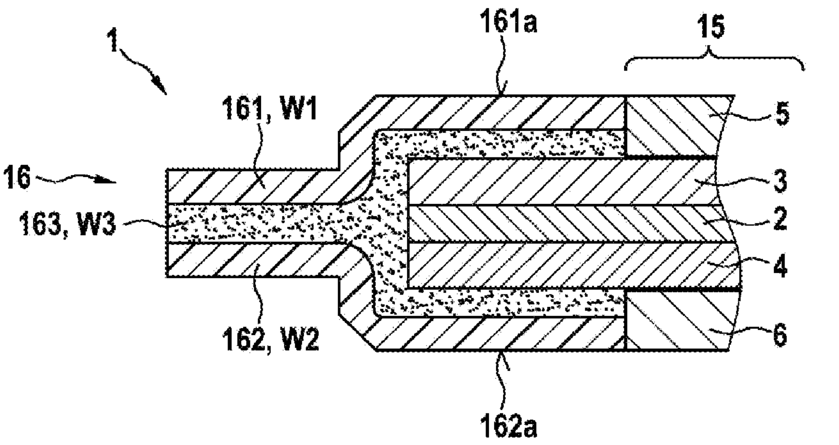

FIG. 4 shows a vertical section of the membrane-electrode assembly 1 of an electrochemical cell 100, in particular of a fuel cell, wherein only the essential regions are shown. The membrane-electrode assembly 1 has the membrane 2, by way of example a polymer electrolyte membrane (PEM), and two porous electrode layers 3 and 4 each having a catalyst layer, wherein the electrode layers 3 and 4 are each arranged on one side of the membrane 2. The electrochemical cell 100 further comprises two diffusion layers 5 and 6, which, depending on the embodiment, can also belong to the membrane-electrode assembly 1.

The membrane-electrode assembly 1 is circumferentially surrounded, outside the active surface 15, by the frame structure 16. This is also referred to as a sub-gasket. The frame structure 16 serves to provide stiffness and tightness to the membrane-electrode assembly 1 and is a non-active region of the electrochemical cell 100.

The frame structure 16 is in particular U-shaped or Y-shaped in section, wherein a first leg of the U-shaped frame portion is formed by a first film 161 from a first material W1 and a second leg of the U-shaped frame portion is formed by a second film 162 from a second material W2. In addition, the first film 161 and the second film 162 are glued together to the central leg of the frame structure 16 by means of an adhesive 163 made of a third material W3. Often, the first material W1 and the second material W2 are identical and made of thermoplastic polymer, for example PEN (polyethylene naphthalate).

The two gas diffusion layers 5 and 6 are virtually inserted into the frame structure 16, usually such that they are in contact with one electrode 3, 4 each above the active surface 15 of the electrochemical cell 100.

The first film 161 has a first connection surface 161*a* for subsequent connection to a bipolar plate 20. And the second film 162 has a second connection surface 162*a* for subsequent connection to another bipolar plate 20. For the stacking process, a bipolar plate 20 is preferably connected to one of the two films 161, 162 of the membrane-electrode assembly 1.

Figure 5:
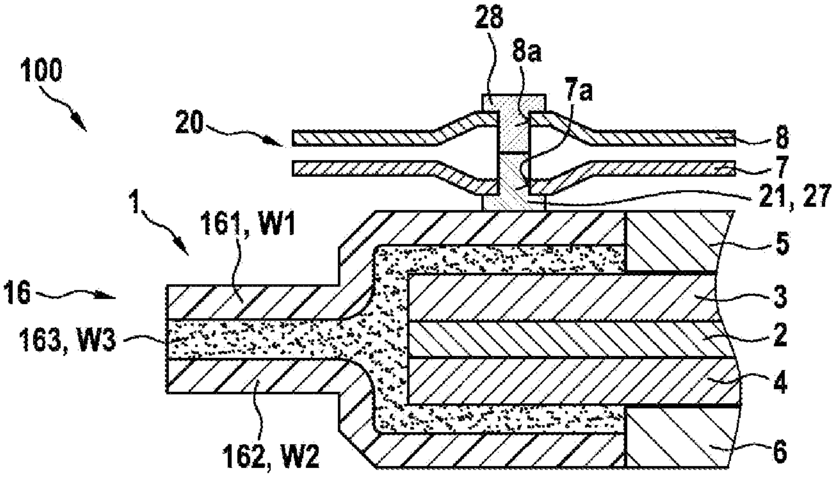

FIG. 5 shows a part of an electrochemical cell 100 according to the invention in cross section. As already mentioned above, the electrochemical cell 100 in the sense of the invention comprises a composite of a membrane-electrode assembly 1 and a bipolar plate 20 and serves to prepare the stacking process of multiple electrochemical cells 100 to a cell stack.

The bipolar plate 20 has two sealing contours 27, 28 to its two adjacent membrane-electrode assemblies 1. A sealing contour 27 is applied to the cathode-side distributor plate 7 of the bipolar plate 20 and interacts with the first film 161 of the frame structure 16 to limit the cathode space 100*a* of the electrochemical cell 100 shown. The second sealing contour 28 is applied to the anode-side distributor plate 8 of the bipolar plate 20 and interacts with the second film 162 of its frame structure 16 after the stacking process to limit the anode space 100*b* of the adjacent electrochemical cell 100 (not shown).

The sealing contour 27 preferably comprises the same material as the film 161, 162 onto which it is arranged; in the case of FIG. 5, this is the first film 161. The sealing contour 27 is preferably melted at two or three points with the first film 161 at the first connection surface 161*a*, thus forming two or three connecting elements 21 with the latter, such that the membrane-electrode assembly 1 is prevented from slipping towards the bipolar plate 20. The sealing contour 27 thus also has the function of connecting elements 21, at least at these welding points. Advantageously, the sealing contour 27 is at least crimped or anchored at the points of the connecting elements 27 in the distributor plate 7 or in the bipolar plate 20. For this purpose, corresponding recesses 7*a* are formed in the distributor plate 7 and in the bipolar plate 20, into each of which a connecting element 21 projects, such that a positive-locking connection is formed perpendicular to the stacking direction z between the connecting element 21 and the bipolar plate 20 and thus also a positive-locking connection between the frame structure 16 and the bipolar plate 20 and thus also a positive-locking connection between the membrane electrode assembly 1 and the bipolar plate 20, such that transverse forces can be transferred against sliding.

In preferred embodiments, the first film 161 and the connecting elements 21 melted to it are formed from the material PEN (polyethylene naphthalate). This material is suitable as a material for the sealing contour 27 as well as for melting with a similar material.

In preferred further developments of the invention, the connecting element 21 projects through both the cathode-side distributor plate 7 and the anode-side distributor plate 8 of the bipolar plate 20—as shown in FIG. 5—so that the mechanical crimping of the connecting element 21 in the bipolar plate 20 is particularly pronounced. Particularly preferably in these cases, the connecting element 21 is designed as a 2-component connecting element, so it comprises two materials, since the associated two sealing contours 27, 28 also consist of two different materials.

In advantageous embodiments, the sealing contour 27 to be welded to the film 161, 162 at the connecting elements 21 is made of PEN and the sealing contour 28 on the opposite side of the bipolar plate 20 is made of PUR. The sealing contour 28 made of PUR is comparatively soft and makes it possible to be able to compensate better for any height tolerances.

Figure 6A:
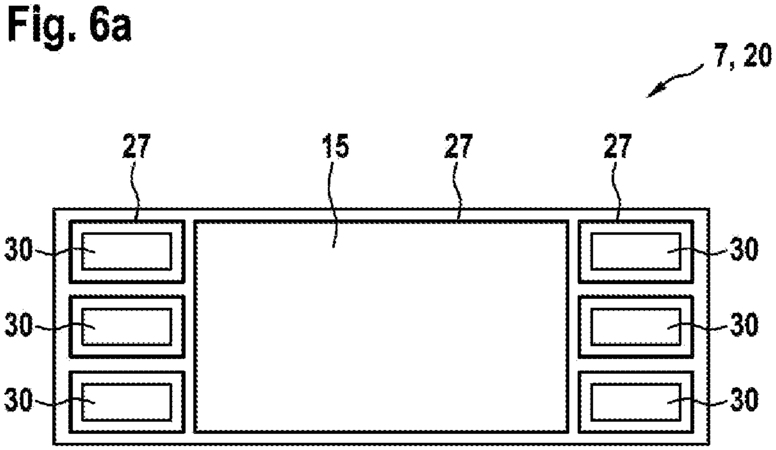
FIG. 6*b* a top view of an anode-side distributor plate, wherein only the essential regions are shown.
Figure 6B:
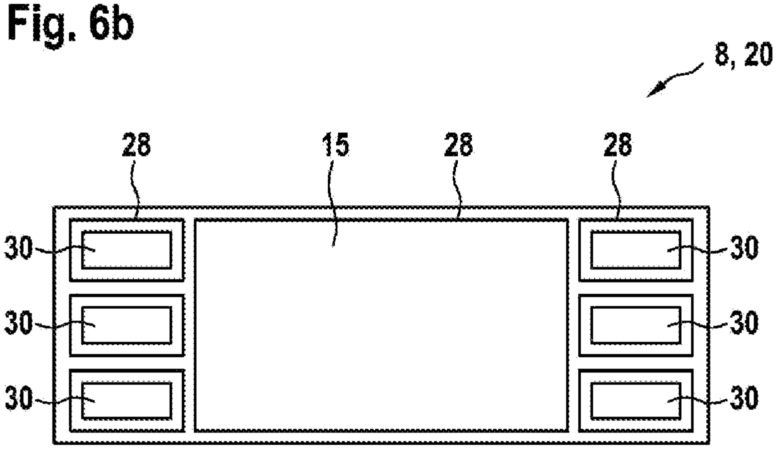

FIG. 6 shows the top view of a bipolar plate 20, wherein only the essential regions are shown. FIG. 6*a* shows the top view of the cathode-side distributor plate 7 and FIG. 6*b* shows the top view of the anode-side distributor plate 8. The cathode-side distributor plate 7 is sealed with the sealing contour 27. In the embodiment of FIG. 6*a*, the sealing contour 27 encloses the active surface 15 and the distributor openings 30. The anode-side distributor plate 8 is sealed with the sealing contour 28. In the embodiment of FIG. 6*b*, the sealing contour 28 encloses the active surface 15 and the distributor openings 30.

Preferably, the anode-side distributor plate 8 is sealed with the sealing contour 28 made of PUR and the cathode-side distributor plate 7 is sealed with the sealing contour 27 made of PEN.

For the connection of a bipolar plate 20 to a membrane-electrode assembly 1, the bipolar plate 20 and the membrane-electrode assembly 1 are thus placed over one another for an exact fit, then the first film 161 or second film 162 contacting the bipolar plate 20 is locally melted in the region of the connecting elements 21, preferably by means of a hot punch, such that a material-bonding connection is produced between the film 161, 162 and the connecting element 21 or the associated sealing contour 27, 28. The mechanical crimping between the bipolar plate 20 and the connecting element 21 ensures that the frame structure 16 cannot detach from the bipolar plate 20. Preferably, the connecting element 21 is virtually a continuation of the associated sealing contour 27, 28 by being applied into the associated recess 7*a*, 8*a*.

In the embodiment of FIG. 5, only the first film 161 is melted with the sealing contour 27 of the cathode-side distributor plate 7 in the region of the connecting elements 21, i.e. in the region in which the cathode-side distributor plate 7 has recesses 7*a* for the crimping of the connecting elements 21 in the distributor plate 7. The second sealing contour 28 acquires its sealing function after stacking multiple electrochemical cells 100 into a cell stack as it interacts with the adjacent electrochemical cell 100.

The invention claimed is:

1. A bipolar plate (20) for an electrochemical cell (100), wherein the bipolar plate (20) includes at least one polymeric connecting element (21) for connection to a membrane-electrode assembly (1), wherein the connecting element (21) is anchored in a recess (7*a*, 8*a*) formed in a bipolar plate (20), and wherein the recess extends through both a cathode side distributor plate (7) and an anode side distributor plate (8) of the bipolar plate (20).

2. The bipolar plate (20) according to claim 1, wherein the connecting element (21) is made of a thermoplastic material.

3. The bipolar plate (20) according to claim 1, wherein the connecting element (21) is a continuation of a sealing contour (27, 28) applied to the bipolar plate (20).

4. The bipolar plate (20) according to claim 3, wherein the connecting element (21) is a continuation of two sealing contours (27, 28) applied to the bipolar plate (20), wherein the two sealing contours (27, 28) are applied to opposite sides of the bipolar plate (20).

5. The bipolar plate (20) according to claim 4, wherein the two sealing contours (27, 28) consist of different materials.

6. An electrochemical cell (100) having a bipolar plate (20) according to claim 1 and a membrane electrode assembly (1), wherein the membrane electrode assembly (1) comprises a frame structure (16), wherein the frame structure (16) comprises a film (161, 162), wherein the film (161, 162) is melted to the connecting element (21).

7. The electrochemical cell (100) of claim 6, wherein the film (161, 162) and the connecting element (21) are made of the same material.

8. The electrochemical cell (100) of claim 6, wherein the connecting element (21) is a continuation of a sealing contour (27, 28), which is arranged between the bipolar plate (20) and the membrane-electrode assembly (1).

9. A process for manufacturing an electromechanical cell (100) according to claim 6, wherein a bipolar plate (20) is connected to a membrane-electrode assembly (1), wherein the bipolar plate (20) comprises at least one polymeric connection element (21) for connection to the membrane-electrode assembly (1), wherein the membrane-electrode assembly (1) comprises a frame structure (16) with at least one film (161, 162), the process comprising the following process steps:

positioning the membrane-electrode assembly (1) to the bipolar plate (20), and melting the film (161, 162) to the connecting element (21).

10. The process according to claim 9 wherein the film (161, 162) is melted to the connecting element (21) using a hot punch.

11. A bipolar plate (20) for a fuel cell (100), wherein the bipolar plate (20) includes at least one polymeric connecting element (21) for connection to a membrane-electrode assembly (1), wherein the connecting element (21) is anchored in a recess (7*a*, 8*a*) formed in a bipolar plate (20), and wherein the recess extends through both a cathode side distributor plate (7) and an anode side distributor plate (8) of the bipolar plate (20).

12. The bipolar plate (20) according to claim 11, wherein the connecting element (21) is made of PEN.

13. The bipolar plate (20) according to claim 12, wherein the connecting element (21) is a continuation of a sealing contour (27, 28) applied to the bipolar plate (20).

14. The bipolar plate (20) according to claim 13, wherein the connecting element (21) is a continuation of two sealing contours (27, 28) applied to the bipolar plate (20), wherein the two sealing contours (27, 28) are applied to opposite sides of the bipolar plate (20).

15. The bipolar plate (20) according to claim 14, wherein the two sealing contours (27, 28) consist of different materials.

16. The electrochemical cell (100) of claim 6, wherein the film (161, 162) and the connecting element (21) are both made of PEN.

* * * * *